No. 696,200. Patented Mar. 25, 1902.
K. SEDLACZEK.
PROCESS OF DRAWING OFF AND MEASURING LIQUOR FROM DIFFUSION VESSELS.
(Application filed Aug. 23, 1901.)
(No Model.)
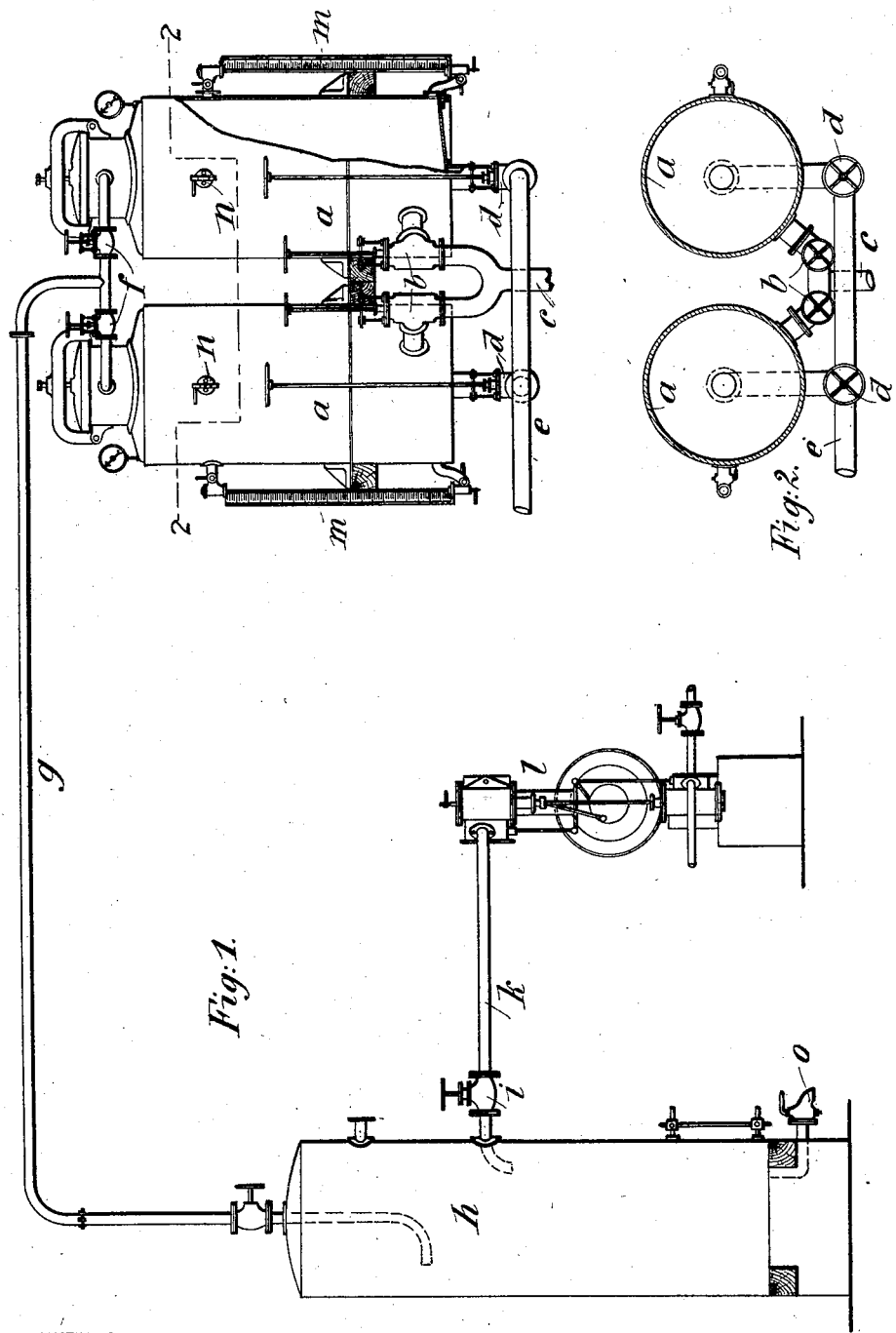
WITNESSES:
INVENTOR
ATTORNEYS

UNITED STATES PATENT OFFICE.

KONSTANTIN SEDLACZEK, OF KLEMBOWKA, SACLAW, RUSSIA.

PROCESS OF DRAWING OFF AND MEASURING LIQUOR FROM DIFFUSION VESSELS.

SPECIFICATION forming part of Letters Patent No. 696,200, dated March 25, 1902.

Application filed August 23, 1901. Serial No. 72,982. (No specimens.)

*To all whom it may concern:*

Be it known that I, KONSTANTIN SEDLACZEK, a subject of the Czar of Russia, residing in Klembowka, Saclaw, Russia, have invented certain new and useful Improvements in Processes of Drawing Off and Measuring Beet-Juice, of which the following is specification.

This invention relates to improvements in processes for drawing off and measuring the crude beet-sugar liquor from the diffusion vessels in which the same is produced in the ordinary course of beet-sugar manufacture by the well-known diffusion process. It has been attempted to accomplish this operation by means of a vacuum, but without practical success. The successful drawing off of the liquor requires the quick formation of a vacuum. When this is not attained, the contact of the beet-juice with the air produces discoloration of the juice and seriously deteriorates the quality of the same. The previous attempts in this line were conducted by means of large air-pumps. The operation was not a continuous one, and the necessary repeated stopping and starting of the pumps was exceedingly wasteful of fuel and time.

The object of this invention is to provide a process by which these difficulties are overcome, and for this purpose the invention consists of the process herein described of drawing off and measuring beet-juice from the diffusion vessels of beet-sugar manufacture, which consists in exhausting the air from a suitable receiver during the filling of the diffusion-cells, then continuously and uniformly exhausting the air from said receiver, connecting said receiver with a measuring vessel under atmospheric pressure, admitting the juice to said measuring vessel at a rate approximately equal to the rate of exhaustion of the air from the receiver, disconnecting said reciver from the measuring vessel, admitting air under atmospheric pressure thereto, simultaneously connecting the receiver with another measuring vessel and admitting the juice thereto at the rate of exhaustion, disconnecting the receiver from said second measuring vessel, admitting air under atmospheric pressure to the same, and simultaneously connecting the receiver with the first measuring vessel for repeating the process.

In the accompanying drawings, Figure 1 is a side view, with a portion of one of the measuring vessels broken away, of an apparatus for carrying out my improved process; and Fig. 2 is a horizontal section on line 2 2, Fig. 1.

Similar letters of reference indicate corresponding parts.

Referring to the drawings, $c$ indicates a supply-pipe connected at one end with the diffusion vessels. These vessels are of the ordinary construction and are not shown in the drawings. Connected with said supply-pipe $c$ are two branch supply-pipes provided with valves $b$, said pipes delivering, respectively, into two measuring-tanks $a$. The measuring-tanks are supported in any suitable manner and are provided each with a gage-glass $m$ and a vent-cock $n$ at the upper part above the level of the gage-glass. The latter terminates at the level to which the liquor is normally drawn in the tank. From the lower part of each measuring-tank $a$ extends a delivery-pipe provided with a valve $d$, said delivery-pipe being connected to a conduit $e$, through which the measured liquor is run off. To the upper part of the measuring-tanks is connected by branch air-pipes a main air-pipe $g$, the branch air-pipes being provided each with a valve $f$. At its opposite end the main air-pipe $g$ is connected with the upper part of a receiver $h$, which is supported in any suitable manner and provided at its lower part with a gage-glass and a discharge pipe and cock $o$. Above the level of the gage-glass is connected an air-pump $l$, preferably operated by steam from a suitable boiler. (Not shown.) The connecting-pipe $k$, between the receiver and air-pump, is provided with a valve $i$.

The air-pump is started and the air exhausted from the receiver during the time that the diffusion-cells are filling. When it is desired to draw off the juice from the cells, the valves $d$ $d$ are closed, also the cock $o$, the valve $i$ opened, and one of the valves $f$ opened. The air-pump is continuously and uniformly operated. The pressure within the measuring vessels at once falls, the corresponding valve $b$ is opened, and the beet liquor being in the diffusion vessel under a pressure in excess of that in the measuring-tank is forced through the pipe $c$ and the branch pipe, the valve of which is opened into the measuring-tank $a$ and rises in the same. When it has risen up to the top of the gage-glass or to any other desired point on the same, the valve $b$ is closed, the valve $f$ closed, and the opposite valve $f$ opened, so that the pressure in the opposite or second tank falls. The valve $d$ of the filled first tank and the vent-cock $n$ of the same are now opened, so that the liquor runs off through the conduit $e$. During this time the valve $b$ of the branch pipe delivering into the second tank is opened, so that the tank is filled in the same manner as the first. The liquor in the same is then run off after closing the valves $b$ and $f$ by opening the valve $d$ and the vent-cock $n$ of the tank, the liquor from the two tanks being conducted away in the same conduit $e$. By the alternate operation of the tanks in the manner described the continuous measuring off of the liquor is effected. When it is desired to ascertain the character of the surface of the liquor in either measuring-tank, the liquor is allowed to flow in the same until it rises above the vent-cock and into the branch air-pipe and through the main air-pipe $g$ into the receiver $h$. It can be drawn off readily from the bottom of the latter by means of the discharge pipe and cock $o$, the gage-glass at the bottom of the receiver serving to indicate the amount drawn over into the receiver, so that the same is not filled up to the level of the connecting-pipe $k$.

By my improved process the liquor is drawn off and measured under minimum contact with air, whereby the juice is not discolored. The efficiency of the battery of diffusion vessels is increased, due to the suction action exerted on the same. By the alternate working of the two measuring vessels the liquor can be continuously drawn off, so that no stopping of the air-pump is necessary, but the same runs continuously. The receiver $h$ serves two purposes. It provides a vessel in which a suitable quantity of the liquor may be drawn off for inspection whenever desired—for instance, to ascertain whether pulp has been introduced into the liquor—and it also serves for reducing the shocks to the air-pump due to the opening and closing of the valves $ff$, so that the regular and uniform operation of the air-pump at a minimum cost for fuel is secured.

Having thus described my invention, I claim as new and desire to secure by Letters Patent—

The process herein described of drawing off and measuring beet-juice from the diffusion vessels of beet-sugar manufacture, which consists in exhausting the air from a suitable receiver during the filling of the diffusion-cells, then continuously and uniformly exhausting the air from said receiver, connecting said receiver with a measuring vessel under atmospheric pressure, admitting the juice to said measuring vessel at a rate approximately equal to the rate of exhaustion of the air from the receiver, disconnecting said receiver from the measuring vessel, admitting air under atmospheric pressure thereto, simultaneously connecting the receiver with another measuring vessel and admitting the juice thereto at the rate of exhaustion, disconnecting the receiver from said second measuring vessel, admitting air under atmospheric pressure to the same, and simultaneously connecting the receiver with the first measuring vessel for repeating the process, substantially as set forth.

In testimony that I claim the foregoing as my invention I have signed my name in presence of two subscribing witnesses.

KONSTANTIN SEDLACZEK.

Witnesses:
ALEKSANDER MOROZEVIRZ,
MARJAN MOTONSKI.